3,523,315
POLY-α-OLEFINIC COMPOSITION HAVING EXCELLENT DYEABILITY

Kenichi Matsui, Atsuo Nakanishi, and Itsuho Aishima, Nobeoka-shi, and Yoshisato Fujisaki, Tokyo, Japan, assignors to Asahi Kasei Kogyo Kabushiki Kaisha, Osaka, Japan
No Drawing. Filed Feb. 15, 1966, Ser. No. 527,527
Int. Cl. D06p 5/00
U.S. Cl. 8—168     9 Claims

ABSTRACT OF THE DISCLOSURE

A composition comprising a polyolefin, a 1,2,4-aminotriazole and a calcium carbonate powder has a remarkably enhanced dyeability, and in addition, has an advantage in that the additive is not eluted during dyeing, whereby the degree of exhaustion is unexpectedly enhanced and a brilliant, deep and fast dyed product is obtained.

---

This invention relates to a poly-α-olefinic composition having excellent dyeability. Since a poly-α-olefin, for example, stereoregular polypropylene, polybutene or straight chain polyethylene, with all its excellent physical properties, has no polar groups in its molecular structure, it has been hitherto difficult to dye shaped products thereof deep and fast and this difficulty has been a great obstacle in the utilization of the useful physical properties thereof.

Much research has been done to overcome the difficulty of dyeing a poly-α-olefin. Most of such research has already been published in patents. There is, for example, the method of introducing polar groups into a shaped product of a poly-α-olefin by treating it chemically, that of admixing a high molecular weight compound having polar groups with a poly-α-olefin before it is shaped so that a shaped product thereof may be dyed mainly with a disperse dye, that of admixing a basic nitrogen compound with a poly-α-olefin before it is shaped so that it may be dyed mainly with an acid dye and that of admixing a polyvalent metal with a poly-α-olefin before it is shaped so that it may be dyed with a special mordant dye by utilizing the metal as dye sites. But the application of these methods in commerce is limited by the following disadvantages: it is difficult to obtain a uniform composition, the shape of the composition is limited, a special mixing method is required, a special dyeing method is needed, sufficient dyeing cannot be effected unless a special chemical treatment is applied before dyeing, and additives contained in the composition are dissolved out during the process of heating or dyeing. Further it often occurs that even if a satisfactory dyed product is obtained using a certain kind of dye, it cannot be obtained with a dye of a different color and, in some cases, the dyeing method and the color tone of the dyed product are limited because only a color having a special chemical structure can be used. When an additive is admixed with a poly-α-olefin before it is shaped, it is necessary that the additive be colorless, and able to withstand the usual shaping temperature. Furthermore since it is necessary that a large amount; and many kinds of dye be taken up by adding a comparatively small amount of the additive, the kind of additive is drastically limited. Further, it occurs that even if the additive meets such requirements, its receptivity to a dye is decreased substantially when it is enclosed in a poly-α-olefin resin: for example, even though the additive itself may absorb a very large amount of acid dye, a shaped product obtained by melting and admixing same with a poly-α-olefin resin can be dyed to a certain extent with a disperse dye but scarcely with the desirable acidic dyes, and even if the dispersiveness of the additive is improved by using same concurrently with a polyvalent metal compound of a higher fatty acid such as aluminum or cadmium stearate, the dyeability with a disperse dye is only improved to a slight extent but only little effect is achieved with an acid dye. Accordingly, there remains the disadvantage that the amount of additive to be added must be increased or a special chemical treatment must be given after shaping. Furthermore, since the additive is a highly polar substance as a result of the necessity for absorbing a large amount of dye, mixing a large amount of it with a non-polar poly-α-olefin is accompanied by great difficulty in the shaping and is liable to produce a deleterious effect upon the inherently excellent physical properties of the poly-α-olefin.

Accordingly, it is an object of the present invention to provide a poly-α-olefin composition which can be deep and fast dyed with an anionic dye more easily with a reduced amount of a polar substance having active sites which are receptive to the dye and without any chemical treatment after its shaping.

Such an object and other advantages can be attained in accordance with a composition of the present invention which comprises a major amount of a poly-α-olefin and a minor amount of an aminotriazolic substance and calcium carbonate having an average particle diameter of not more than 2 microns preferably not more than 0.2 micron, the amount of aminotriazolic substance being 0.5 to 10% preferably 1 to 5% based upon the weight of the composition, the amount of calcium carbonate being 5 to 1000% based upon the weight of the aminotriazolic substance and not less than 0.5% based upon the weight of the composition and the total amount of aminotriazolic substance and calcium carbonate being not more than 20% based upon the weight of the composition. In this invention, the aminotriazolic substance is one of the following: A substance having one aminotriazol ring of the formula:

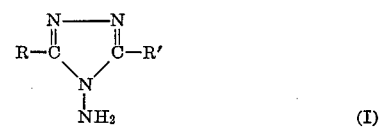

wherein R and R' are alkyl, aralkyl or alicyclic groups, which may be the same or different from one another.

A substance having not less than two aminotriazol rings of the formula:

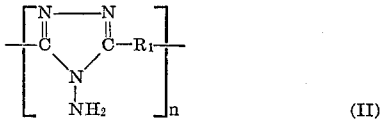

wherein $R_1$ is one of the following groups.

(1) a substituted or unsubstituted alkylene group of the formula: —$(CH_2)_m$—, where $m=1-10$,
(2) a substituted or unsubstituted cycloalkylene group,
(3) a substituted or unsubstituted phenylene group,
(4) a bivalent heterocyclic group,
(5) a substituted or unsubstituted naphthylene group, or
(6) one or more of the said preceding groups bonded together by a sulfone, ether, ketone, carbonyl, amide, imino or sulfamide group, or a combination of the same of different kinds of the said groups, and $n$ is an integer not less than 2.

The said substance (II) is described in Japanese patent publication No. 24,577/1964.

A heterocyclic compound other than an aminotriazol, for example, one having a triazol or oxazol ring or one containing partially another bond, for example, an acid amide, urea or polyurethane bond as its constituting unit may also be used.

The endowment of a shaped product of a poly-α-olefin with dyeability by admixing same with an aminotriazolic substance and melt-shaping the resultant mixture has been described in Japanese patent publication No. 24,577/1963 and the present invention is a further improvement on the above mentioned composition.

That is, shaped products obtained by adding and admixing one of the aminotriazol derivatives expressed under (I) above or a polyaminotriazol expressed under (II) above with a poly-α-olefin resin and melt-shaping the mixture can hardly be dyed with a common anionic dye, and the said aminotriazolic substance is often dissolved out on its surface, so that the shaped product cannot be dyed deep and clear in some cases. But when calcium carbonate is used concurrently therewith, according to this invention, such dissolving out is prevented and at the same time dyeing can be effected in deep and clear colors.

According to this invention, therefore, as is shown in the examples to be described below, the adsorption ratio of an anionic dye on dyeing a shaped product of a poly-α-olefin can be improved substantially, as compared with dyeing thereof when it contains only an aminotriazolic substance, and especially, even with incorporation of aminotriazolic substance in the amount of 1–3 (wt.) percent relative to the composition, if 50–500 (wt.) percent of calcium carbonate is added relative to the aminotriazolic substance and then the mixture is melt-shaped, the shaped product thus obtained can be freely dyed in any color tone and depth.

Calcium carbonate itself has been employed as weighting agents for shaped products of poly-α-olefins but it is unexpected that, when used together with an aminotriazolic substance, it substantially improves the dyeability of the poly-α-olefin with an anionic dye.

This invention is characterized especially by adding calcium carbonate concurrently with an aminotriazolic substance to a poly-α-olefin resin. Accordingly, even if calcium carbonate is contained together with a polyurea resin in a poly-α-olefin resin, such a substantial improvement of dyeing with an anionic dye as in this invention can not be attained. Further, even if the composition of this invention, when deprived of the aminotriazolic substance, that is, a poly-α-olefin containing only calcium carbonate, is dyed with an anionic dye, a colored product can scarcely be obtained.

This invention makes it possible to provide, for the first time, a novel poly-α-olefinic composition having a remarkably excellent affinity to anionic dyes by means of a specific combination of the said aminotriazolic substance and calcium carbonate having an average particle diameter of not more than 2 microns at their specific mixing ratio.

The particle diameter of the calcium carbonate used in this invention is of prime importance. That is, if calcium carbonate which is added and mixed, concurrently wth an aminotriazolic substance, with a poly-α-olefin resin, has an average particle diameter of not less than 2 microns, the pronounced effect which is aimed at in this invention is not found in when dyeing with an anionic dye. On the contrary, if the average particle diameter is not more than 2 microns, preferably not more than 0.2 micron, its concurrent use with an aminotriazolic substance results in a substantial improvement of the dyeability. But this effect does not appear in the case of a common disperse dye but appears very clearly in the case of an anionic dye.

The calcium carbonate need not be completely pure chemically but ordinary precipitated calcium carbonate or that obtained by grinding naturally available calcite, marble, limestone or the like. Further, the calcium carbonate can be treated in advance for example with poly-α-olefins, higher fatty acids or their metal salts, for preventing its cohesion or for other purposes.

In the operation of this invention, with regard to adding and admixing the aminotriazolic substance and the calcium carbonate with a poly-α-olefin resin, it can be carried out easily by means of a conventional method, e.g., using a milling roller, mixer, blender or extruder type mixer, and there is no need for using any special means for it. When the calcium carbonate is milled in the molten poly-α-olefin, it is dispersed easily and uniformly and further promotes the dispersion of the co-existing aminotriazolic substance. When calcium carbonate is not added, the dyeability of the resultant shaped product is apt to change, depending on the degree of dispersion of the aminotriazolic substance in it but when the calcium carbonate is added, there is the advantage that the dyeability does not change. The additioin of calcium carbonate scarcely reduces the clarity of the color of the dyed product but tends to increase it. The aminotriazolic substance or calcium carbonate may be mixed in advance with a part of the poly-α-olefin resin at a temperature near or above the melting point of the resin, or addition to the poly-α-olefinic substance can be carried out after the calcium carbonate is mixed with the aminotriazolic substance.

The composition of this invention is characterized by displaying a remarkable effect on dyeing with general anionic dyes, especaly acid dyes (including metal-containing-dyes of the 1:1 type and the 1:2 type), direct dyes, acid mordant dyes and reactive dyes for cellulose. Such effect cannot be obtained, however, on dyeing other than anionic dyes, for example, disperse dyes.

The method for dyeing the compositions of this invention with an anionic dye is not limited to any particular one but can follow the usual method for dyeing with an acid dye. Particularly the ratio of the adsorption of the dye is further enhanced by employing such dyeing assistants as halogenated acetic acid, benzyl halide, benzal halide, benzo tri-halide or aromatic carboxylic acid, in order to reduce the pH of the dyeing bath. Furthermore the ratio is also enhanced by treating it in the dyeing assistant dispersed in water or with an aqueous solution thereof before it is dyed.

The poly-α-olefins useful in the present invention, include for example polyethylene, polypropylene, polybutene, polypentene, polystyrene or their copolymer or mixtures. The present composition comprising such a polyolefin as the main ingredient provides fibers, films or sheets which can be easily dyed clear with an ordinary anionic dye. Further, the composition of this invention does not hinder the effectivenes of light stabilizers, heat stabilizers and fluorescent whitening agents and further, products dyed with the said dye have excellent fastness against light and dry cleaning.

For a clear understanding of the invention, the following specific example are given. These examples are intended to be merely illustrative of the invention and not in limitation thereof.

EXAMPLE 1

Sebacic acid dihydrazide was condensed on heating to obtain a polyaminotriazol (the intrincic viscosity of its solution as measured in m-cresol at 30° C. being 0.31 and its melting point being 230°–232° C.) and consisting essentially of the following structural unit

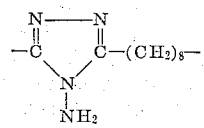

30 g. of this polymer were mixed with 30 g. of precipitated calcium carbonate (having an average particle ditmeter of 0.1 micron). The mixture, together with 940 g. of powder or pellets of crystalline polypropylene (having a viscosity average molecular weight of about 120,000) was kneaded in a Banbury mixer before being cut into pellets. The pellets were melt-spun at 260° C. and the filaments thus obtained were stretched to four times their original length at 120° C. to obtain fibers of about 2 denier monofilament. 20 g. of this fiber were dyed deep orange or blue in an acid dye bath containing 1 l. of salicylic acid (4 g./l.) with 0.6 g. of C.I. Acid Orange 6, 14270 or C.I. Direct Blue 1, 24410 at 100° C. and for 90 min. The ratios of its adsorption of the dyes were more than 99% respectively.

On the other hand, in the case where less than 5 g. of precipitated calcium carbonate was added, the ratios of its adsorption of the dyes were less than 70%.

EXAMPLE 2

A mixture of 25 g. of the same polyaminotriazol as that of Example 1 and 25 g. of precipitated calcium carbonate (having an average partial diameter of 0.1 micron), together with powder or pellets of low pressure polyethylene (having a viscosity average molecular weight of about 180,000), was kneaded in a Banbury mixer before being cut into pellets. The pellets were melt-spun before bein gcut into pellets. The pellets were melt-spun at 220° C. to obtain fibers of 200 denier monofilament.

20 g. of these fibers were dyed deep red or violet in an acid dye bath of 1 l. of o-chlorobenzoic acid (4 g./l.) with 0.6 g. of C.I. Acid Red 111, 23265 or C.I. Acid Violet 51, 62165 at 100° C. and for 120 min. The ratios of its absorption of the dyes were more than 90% respectively.

On the other hand, in the case where calcium carbonate was not added, the ratios of its adsorption of the dyes were less than 60%.

EXAMPLE 3

In this example an aminotriazol of the following chemical structure (having a melting point of 145.5° C.) was used in place of the polyaminotriazol and as the result of spinning and dyeing by the same methods as those of Example 1, a product dyed deep orange or blue was obtained. The ratios of its adsorption of the dyes were more than 95% respectively.

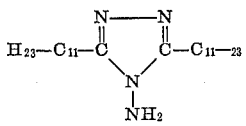

On the other hand, fibers obtain without the addition of precipitated calcium carbonate were not dyed deep, while the aminotriazol was dissolved out resulting from dyeing with the acid dye, thereby reducing the dyeing fastness substantially.

EXAMPLE 4

Adipic acid dihydrazide and sebacic acid dihydrazide were mixed together in equimolar amounts and the mixture was condensed on heating to obtain a copolymer of a polyaminotriazol (the intrinsic viscosity of its solution as measured in m-cresol at 30° C. being 0.45 and its melting point being 180°–183° C.) consisting essentially of the following two structural units.

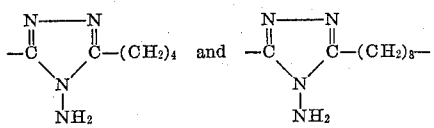

A mixture of 300 g. of this copolymer, 300 g. of precipitated calcium carbonate (having an average particle diameter of 0.05 micron) and 30 g. of calcium stearate was mixed with 10 kg. of pellets of crystalline polypropylene (having a viscosity average molecular weight of about 120,000) which had been made in advance to contain 30 g. of 2-hydroxy-4-n-octoxybenzophenone, 25 g. of dilauryl-thiodipropionate and 25 g. of 2,2'-methylene-bis (4-methyl-6-tert-butyl) phenol. The mixture thus obtained was kneaded in a Banbury mixer before being cut into pellets. They were melt-spun at 260° C. and the resultant filaments were stretched 3.5 times their original length to obtain fibers of about 3 denier monofilament, 20 g. of these fibers were dyed deep red in an acid dye bath of 1 l. of orthocresotinic acid (2 g./l.) with 0.6 g. of C.I. Acid Red 80, 18736 at 100° C. and for 90 min. The ratio of its adsorption of the dye was 98%.

On the other hand, in a case where the fibers were obtained without the addition of precipitated calcium carbonate, the ratio of its adsorption of the dye was less than 70%.

EXAMPLE 5

In this example, an aminotriazol (having a melting point of 134.5° C.) having the following chemical structure was used in place of the copolymer of polyaminotriazol to obtain pellets by the same kneading and mixing methods as in Example 4.

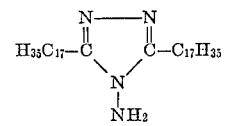

The pellets were melt-extruded to obtain sheets of about 0.1 mm. thickness. 20 g. of the sheets were dyed deep violet in an acid bath of 1 l. of salicylic acid (4 g./l.) with 0.6 g. of C.I. Acid Violet 43, 60730 at 100° C. and for 90 min. The ratio of its adsorption of the dye was 95%.

On the other hand, in the case of the sheets obtained without the addition of precipitated calcium carbonate, the ratio of its adsorption of the dye was less than 60%.

EXAMPLE 6

A block copolymer (the intrinsic viscosity of its solution as measured in m-cresol at 30° C. being 0.46) and consisting essentially of the following two kinds of structural units was obtained

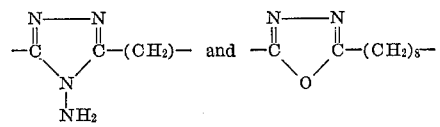

A mixture of 300 g. of this copolymer and 300 g. of precipitated calcium carbonate (having an average particle diameter of 0.08 micron) was mixed with 10 kg. of powdered crystalline polypropylene (having a viscosity average molecular weight of about 120,000). The mixture was melt-extruded with an extruder at 260° C. to obtain the pellets. They were melt-spun at 260° C. and the resultant filaments were stretched to three times their original length to obtain fibers of about 3 denier monofilaments.

20 g. of the fibers was dyed deep violet in an acid dye bath of 1 l. of salicylic acid (4 g./l.) with 0.6 g. of C.I. Acid Violet 51, 62165 at 100° C. and for 90 min. The ratio of its adsorption of the dye was 97%.

On the other hand, in the case of the fibers obtained the addition of precipitated calcium carbonate, the ratio of its adsorption of the dye was less than 70%.

EXAMPLE 7

A block copolymer (the intrinsic viscosity of its solution in m-cresol at 30° C. being 0.22) and consisting essentially of the following two kinds of structural units was obtained

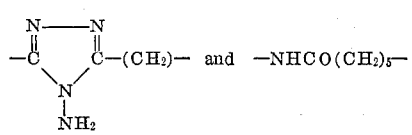

A mixture of 300 g. of this copolymer, 300 g. of precipitated calcium carbonate (having an average particle diameter of 0.08 micron) and 50 g. of aluminum stearate was mixed with 10 kg. of powdered crystalline polypropylene (having a viscosity average molecular weight of about 120,000). The mixture was melt-extruded with an extruder at 260° C. to obtain the pellets. They were melt-spun at 260° C. and the resultant filaments were stretched to three times their original length to obtain fibers of about 3 denier monofilaments.

20 g. of these fibers were dyed deep red in an acid dye bath of 1 l. of salicylic acid (4 g./l.) with 0.6 g. of C.I. Acid Red 83, 68220 at 100° C. and for 90 min. The ratio of its adsorption of the dye was 95%.

On the other hand, in the case of the fibers obtained without the addition of precipitated calcium carbonate, the ratio of its adsorption of the dye was less than 65%.

EXAMPLE 8

A block copolymer (the intrinsic viscosity of its solution as measured in m-cresol at 30° C. being 0.25) and consisting essentially of the following two kinds of structural units was obtained $$-\overset{N-\!\!-\!\!-N}{\underset{\underset{NH_2}{N}}{C\diagup\!\!\diagdown C}}-(CH_2)- \quad \text{and} \quad -NHCONH(CH_2)_4-$$

A mixture of 300 g. of this copolymer and 300 g. of precipitated calcium carbonate (having an average particle diameter of 0.08 micron) was mixed with 10 kg. of powdered crystalline polypropylene (having a viscosity average molecular weight of about 120,000). The mixture was melt-extruded with an extruder at 260° C. to obtain the pellets. They were melt-spun at 260° C. and the resultant filaments were stretched to three times their original length to obtain fibers of about 3 denier monofilaments.

20 g. of these fibers were dyed deep green in an acid dye bath of 1 l. of salicylic acid (4 g./l.) with 0.6 g. of C.I. Acid Green 41, 62560 at 100° C. and for 90 min. The ratio of its adsorption of the dye was 96%.

On the other hand, in the case of the fibers obtained without the addition of precipitated calcium carbonate, the adsorption ratio was less than 70%.

EXAMPLE 9

30 g. of the fibers obtained in Examples 1, 3 and 4 were treated in 1 l. of an aqueous solution of salicylic acid (4 g./l.) at 100° C. and for 60 min., before being washed with water and dried.

20 g. of each of these treated fibers were dyed deep yellow in an acid dyeing bath (pH 3.0) of 1 l. of an aqueous acetic acid solution containing 0.6 g. of C.I. Acid Yellow 117, 24820 at 100° C. and for 90 min. The ratio of their adsorption of the dye was more than 97%.

On the other hand, in the case of the same fibers obtained without the addition of precipitated calcium carbonate, the ratio of their adsorption of the dye was less than 70%.

EXAMPLE 10

The fibers used in Example 9 were treated wtih an aqueous solution of acetic acid (10 g./l.), formic acid (10 g./l.), monochloroacetic acid (10 g./l.) or benzyl chloride (4 g./l.) dispersed in water, in place of the aqueous solution of salicylic acid. The treated fibers were dyed deep yellow in the same way as in Example 9. The ratio of their adsorption of the dye was more than 95%.

On the other hand, in the case of the fibers obtained without the addition of precipitated calcium carbonate the adsorption ratio was less than 65%.

EXAMPLE 11

In Examples 1, 3 and 4, the fibers obtained with addition of Hakuenka CCR (manufactured by Shiraishi Industrial Co., Ltd.: 95% calcium carbonate having a true specific gravity of 2.52 and an average particle diameter of 0.08 micron), in place of precipitated calcium carbonate, was spun and dyed. As a result, the same dyed product was obtained as those of Examples 1, 3 and 4.

What is claimed is:

1. A poly-α-olefinic composition which comprises a fiber forming poly-α-olefin, a 1,2,4-aminotriazolic substance and calcium carbonate powder having an average particle size of not more than 2 microns, wherein the amount of the 1,2,4-aminotriazolic substance is 0.5 to 10% by weight based upon the total weight of the composition, the amount of the calcium carbonate is 5 to 1000% by weight based upon the weight of the 1,2,4-aminotriazolic substance and not less than 0.5% by weight based upon the total weight of the composition and the total amount of the 1,2,4-aminotriazolic substance and the calcium carbonate is less than 20% by weight based upon the total weight of the composition.

2. A composition as claimed in claim 1, wherein the calcium carbonate powder has an average particle size of not more than 0.2 micron and the amount of the 1,2,4-aminotriazolic substance is 1 to 5% by weight based upon the total weight of the composition.

3. A composition as claimed in claim 1, wherein the calcium carbonate is coated with a coating agent.

4. A composition as claimed in claim 1, wherein the calcium carbonate is incorporated with a dispersing agent.

5. A composition as claimed in claim 1, wherein the composition further comprises a light stabilizer, a heat stabilizer and a fluorescence whitening agent.

6. A shaped article shaped from a poly-α-olefinic composition as claimed in claim 1.

7. A composition as claimed in claim 1, wherein the poly-α-olefin is selected from the class of low pressure polyethylene, stereoregular polypropylene, poly-3-methylbutene-1, poly - 4 - methylpentene-1, poly - iso - butene, polystyrene, copolymers having monomers selected from the group consisting of ethylene, propylene, 3-methylbutene-1, 4-methyl-pentene-1, isobutene, styrene and mixtures of said polymers.

8. A composition as claimed in claim 1, wherein the 1,2,4-aminotriazolic substance is a compound having at least one 1,2,4-aminotriazole ring and 1,2,4-polyaminozole.

9. A composition as claimed in claim 1, wherein the calcium carbonate powder has an average particle size of not more than 0.2 micron.

References Cited

UNITED STATES PATENTS

| 3,236,918 | 2/1966 | Tsunoda et al. | 8—55 |
| 3,316,054 | 4/1967 | Tsunoda et al. | 8—55 |
| 3,332,927 | 7/1967 | Cottingham | 260—93.7 |
| 3,355,416 | 11/1967 | Stevenson | 260—41 |
| 3,331,806 | 7/1967 | Fior et al. | 260—41 |

FOREIGN PATENTS

| 504,620 | 1/1947 | Great Britain. |

OTHER REFERENCES

R. Bostwick and R. H. Carey: Ind. and Eng. Chem., 42 (5,) pp. 848–849, May 1950.

NORMAN G. TORCHIN, Primary Examiner

JOHN E. CALLAGHAN, Assistant Examiner

U.S. Cl. X.R.

8—180; 260—41